(12) United States Patent
Kong

(10) Patent No.: US 8,659,537 B2
(45) Date of Patent: Feb. 25, 2014

(54) BACKLIGHT UNIT AND DISPLAY DEVICE

(75) Inventor: Sung Min Kong, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 392 days.

(21) Appl. No.: 13/005,148

(22) Filed: Jan. 12, 2011

(65) Prior Publication Data

US 2011/0193890 A1 Aug. 11, 2011

(30) Foreign Application Priority Data

Jan. 15, 2010 (KR) ........................ 10-2010-0004109

(51) Int. Cl.
*G09G 3/36* (2006.01)
(52) U.S. Cl.
USPC ........... 345/102; 345/211; 345/213; 345/204; 345/690; 315/224; 315/312; 362/237; 362/240
(58) Field of Classification Search
USPC .......... 345/102, 211–213, 690; 362/237, 240, 362/242, 244, 249; 315/224, 312
See application file for complete search history.

(56) References Cited

U.S. PATENT DOCUMENTS

| | | | |
|---|---|---|---|
| 6,773,139 B2* | 8/2004 | Sommers | 362/237 |
| 6,910,783 B2* | 6/2005 | Mezei et al. | 362/615 |
| 6,976,779 B2* | 12/2005 | Ohtsuki et al. | 362/608 |
| 7,559,664 B1 | 7/2009 | Wallenman et al. | 362/84 |
| 8,018,427 B2* | 9/2011 | Hamada | 345/102 |
| 2003/0043567 A1* | 3/2003 | Hoelen et al. | 362/31 |
| 2005/0058450 A1 | 3/2005 | Yamamoto et al. | 398/25 |
| 2005/0141244 A1 | 6/2005 | Hamada et al. | 362/612 |
| 2006/0232544 A1 | 10/2006 | Sakashita | 345/102 |
| 2008/0144334 A1* | 6/2008 | Shin et al. | 362/612 |
| 2008/0316767 A1 | 12/2008 | Woo et al. | 362/612 |
| 2009/0168455 A1 | 7/2009 | Kim et al. | 362/613 |

FOREIGN PATENT DOCUMENTS

| | | |
|---|---|---|
| JP | 2004-303758 A | 10/2004 |
| JP | 2005-302659 A | 10/2005 |
| JP | 2009-224138 A | 10/2009 |
| KR | 10-2009-0071488 A | 7/2009 |

OTHER PUBLICATIONS

European Search Report dated May 11, 2011 issued in Application No. 11 15 0982.
Korean Office Action dated Dec. 3, 2010 issued in Application No. 10-2010-004109.

* cited by examiner

*Primary Examiner* — Jennifer Nguyen
(74) *Attorney, Agent, or Firm* — KED & Associates, LLP

(57) ABSTRACT

Disclosed are a backlight unit and a display device. The backlight unit includes alight emitting module including a plurality of light emitting devices; a controller for controlling an operation of the light emitting module; a light guide plate disposed at one side of the light emitting module; and an optical member disposed on or under the light guide plate. The light emitting module includes a first light emitting device and a second light emitting device. Light linearity of the first light emitting device is superior to light linearity of the second light emitting device, and a light orientation angle of the first light emitting device is smaller than a light orientation angle of the second light emitting device. The controller selectively drives the first and second light emitting devices.

15 Claims, 13 Drawing Sheets

BACKLIGHT UNIT AND DISPLAY DEVICE

The present application claims priority under 35 U.S.C. §119(a) of Korean Patent Application No. 10-2010-0004109 filed on Jan. 15, 2010, which is hereby incorporated by reference in its entirety.

BACKGROUND

The embodiment relates to a backlight unit and a display device.

A light emitting diode (LED) is a semiconductor light emitting device that converts current into light. Recently, the brightness of the LED is increased, so that the LED has been employed as a light source for a display device, a vehicle, or a lighting device. In addition, the LED can represent a white color having superior light efficiency by employing luminescence materials or combining LEDs having various colors.

The brightness of the LED may vary depending on various conditions such as an active layer structure, a light extraction structure for effectively extracting light to the outside, semiconductor materials used for the LED, a chip size, and the type of molding members surrounding the LED.

Such an LED is packaged so as to be used for a backlight unit and a display device.

SUMMARY

A backlight unit according to the embodiment may include a light emitting module including a plurality of light emitting devices; a a second light emitting device. Light linearity of the first light emitting device is superior to light linearity of the second light emitting device, and a light orientation angle of the first light emitting device is smaller than a light orientation angle of the second light emitting device. The controller selectively drives the first and second light emitting devices.

A display device according to the embodiment may include a display panel to display an image; a light emitting module to generate light irradiated toward the display panel; a light guide plate disposed at one side of the light emitting module to guide the light toward the display panel; and a controller for controlling an operation of the light emitting module according to image data by receiving the image data for images to be displayed on the display panel. The light emitting module includes a first light emitting device and a second light emitting device. Light linearity of the first light emitting device is superior to light linearity of the second light emitting device, and a light orientation angle of the first light emitting device is smaller than a light orientation angle of the second light emitting device. The controller selectively drives the first and second light emitting devices according to the image data input thereto.

DETAILED DESCRIPTION OF THE EMBODIMENTS

Hereinafter, embodiments will be described in detail with reference to accompanying drawings. The technical scope of the embodiments will fall within the scope of this disclosure, and addition, deletion and modification of components or parts are possible within the scope of the embodiments.

Figure 1:
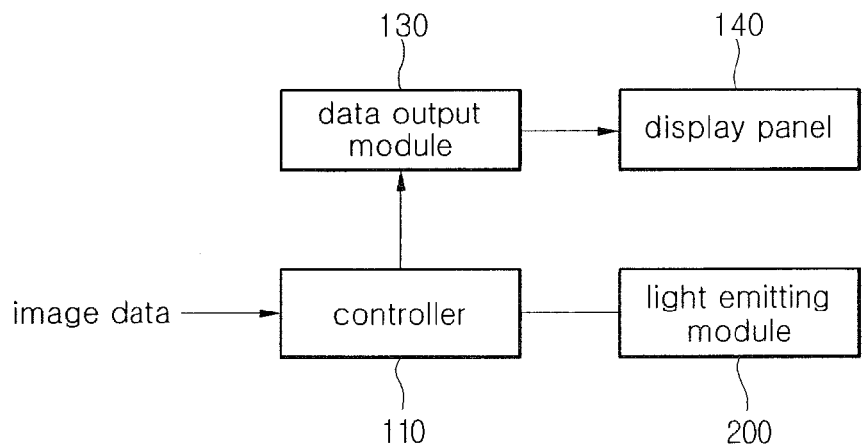
FIG. 1 is a block view showing the structure of a display device according to the embodiment.
Figure 2:
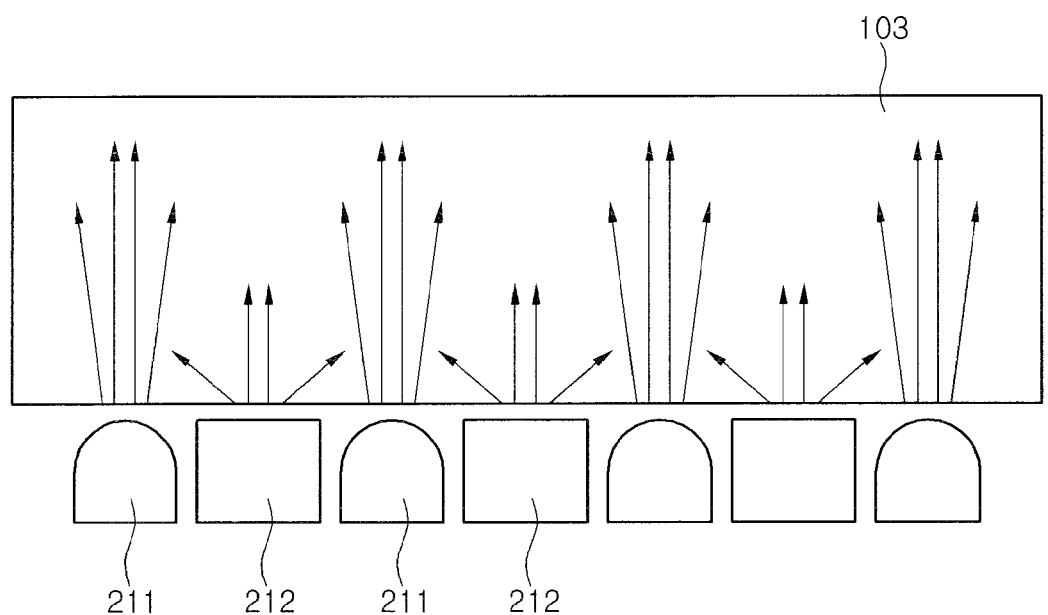
FIG. 2 is a view showing light emitting devices representing various optical properties according to the embodiment.

FIG. 1 is a block view showing the structure of a display device according to the embodiment, and FIG. 2 is a view showing light emitting devices representing various optical properties according to the embodiment.

The display device according to the embodiment includes a controller 110 for controlling the operation of a light emitting module 200 according to image data input thereto, and a data output module 130 for outputting the image data through a display panel 140. The data output module 130 can be integrally formed with the controller 110 in the form of a microprocessor.

The controller 110 controls the operation of the light emitting module 200 according to image data input thereto. In detail, the controller 110 selectively operates light emitting devices constituting the light emitting module 200.

According to the embodiment, as shown in FIG. 2, the light emitting devices have various optical properties. For instance, light emitting devices 211 having superior light linearity are employed together with light emitting devices 212 having wide light orientation angles. The light linearity and the light orientation angle (hereinafter, simply refereed to as linearity and orientation angle) are relative terms, so critical values of the linearity and the orientation angle are preset and the light emitting devices are classified into the light emitting devices having the superior linearity characteristics and the light emitting devices having the superior orientation angle characteristics based on the critical values for the linearity and the orientation angle.

For instance, the light emitting device 211 having the superior linearity represents the orientation angle in the range of above 45° to below 100°, and the light emitting device 212 having the wide orientation angle represents the orientation angle in the range of 100° to 150°. In detail, the light emitting device 211 having the superior linearity may represent the orientation angle in the range of 60° to 90°, and the light emitting device 212 having the wide orientation angle represents the orientation angle in the range of 120° to 150°.

In addition, the light emitting devices can be classified into the light emitting device 211 having the superior linearity and the light emitting device 212 having the wide orientation angle according to the existence of a lens at an upper portion of the light emitting devices or a lens shape of the light emitting devices. For instance, the light emitting device 211 having the superior linearity may be manufactured by using a blue laser diode including GaN, InGaN, AlGaN or AlGaInN.

The light emitting device 211 having the superior linearity has the advantage of irradiating light far away, but only a part of a light incident section of a light guide plate adjacent to the light emitting device 211 may be brightened, which is called 'hot spot'.

Meanwhile, the light emitting device 212 may have superior orientation angle characteristics by forming a lens on the light emitting device 212 or by forming a roughness on a surface of a lens such that the light can be partially scattered on the surface of the lens.

Although the light emitting device 212 having the superior orientation angle characteristics may not cause the hot spot, the light efficiency may be lowered because the light emitting device 212 has the short light irradiation distance. In this specification, the light emitting devices having various optical properties will be classified into a first light emitting device 211 and a second light emitting device 212. In addition, for the purpose of explanation, the light emitting device having the superior linearity will be referred to as the first light emitting device 211 and the light emitting device having the wide orientation angle will be referred to as the second light emitting device 212.

Based on the light emitting devices having various properties, the controller 110 selects the dimming region and controls the light emitting module 200 such that the light emitting devices corresponding to the dimming region can be driven. The operation of the light emitting module 200 under the control of the controller 110 will be described below in detail with reference to accompanying drawings.

Meanwhile, a data sync part can be provided at an input terminal of the controller 110 that receives the image data. The data sync part may combine R, G and B image data transmitted from external equipment, such as a graphic card or a TV, into a 1-frame data image. In addition, the data output module 130 may transfer the image data, which are input into the data sync part, to a timing controller that generates control signals for various drivers to drive the display panel 140.

If the controller 110 determines that the image must be locally brightened or the image must be locally more darkened based on the image signal of the image data input thereto, the controller 110 performs the dimming with respect to corresponding regions.

Hereinafter, the operation of the controller 110 to perform the dimming by controlling the light emitting module 200 will be described in detail.

Figure 3:
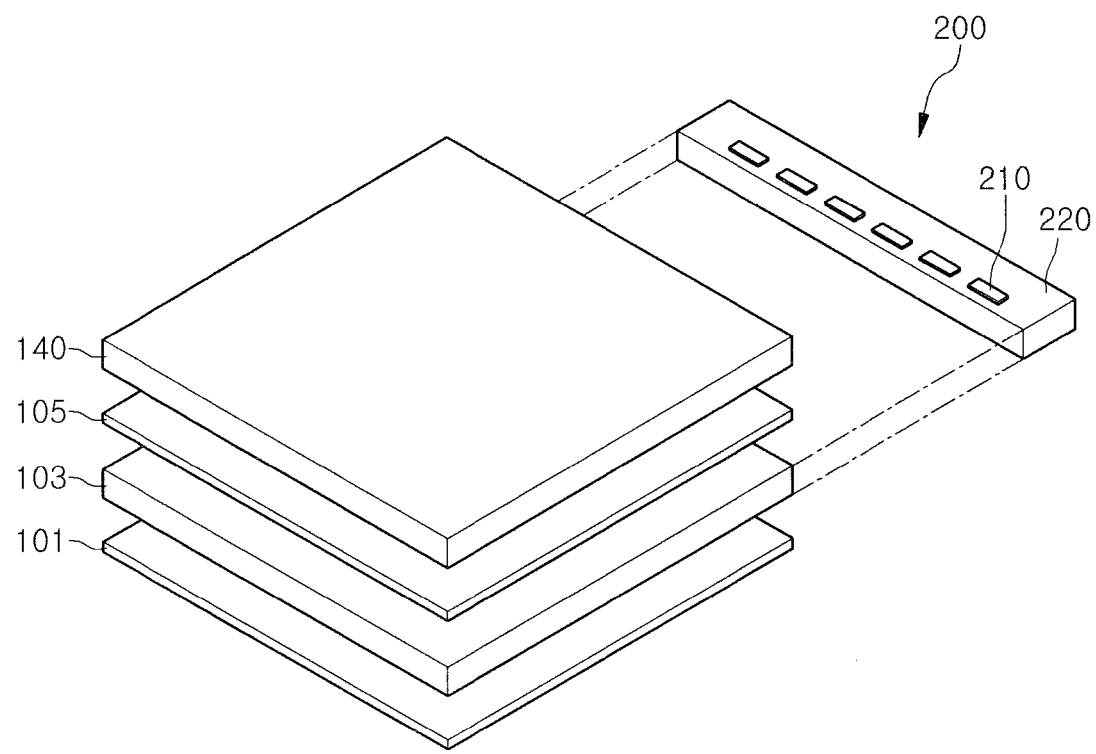
FIG. 3 is an exploded perspective view schematically showing the structure of a display device according to the first embodiment.

FIG. 3 is an exploded perspective view schematically showing the structure of the display device according to the first embodiment.

FIG. 3 shows the display device including the light emitting module having a plurality of light emitting devices with various optical properties according to the embodiment.

Referring to FIG. 3, the display device includes a light emitting module 200 having light emitting devices 210, a reflective plate 101, a light guide plate 103, an optical sheet 105 and a display panel 140.

The light emitting module 200 is positioned at one lateral side of the light guide plate 103 and the light emitted from the light emitting module 200 is incident into the lateral side of the light guide plate 103. The light emitting module 200 includes a plurality of light emitting devices 210 mounted on a substrate 220.

The light guide plate 103 guides the light incident into the light guide plate 103 in such a manner that a surface light can be output through the light guide plate 103. In addition, a reflective pattern can be formed on at least one surface of the light guide plate 103.

The reflective plate 101 is positioned under the light guide plate 103 to reflect the light leaked downward from the light guide plate 103.

The light output from the light guide plate 103 is irradiated onto the display panel 140 through the optical sheet 105. The optical sheet 105 may include at least one of a diffusion sheet and a prism sheet. The diffusion sheet is positioned above the light guide plate 103 to diffuse the incident light. The prism sheet is positioned above the diffusion sheet to focus the diffused light onto the display region.

The light emitting module 200, the light guide plate 103 and the optical sheet 105 may constitute the backlight unit and the backlight unit includes the reflective plate 101. In addition, some components of the backlight unit can be accommodated in a receptacle, such as a mold frame, a chassis structure, or a metal bottom cover.

The display panel 140 is a liquid crystal panel including two transparent substrates and liquid crystal and displays information as the light is transmitted through the liquid crystal. The embodiment does not limit the type of the display panels 140, so various display panels can be employed in the embodiment. In addition, the display panel 140 can be aligned at both sides of the light guide plate 103.

Such a display device can be used for a portable terminal, such as a cellular phone or a PMP (portable multimedia player), or a computer.

Figure 4:
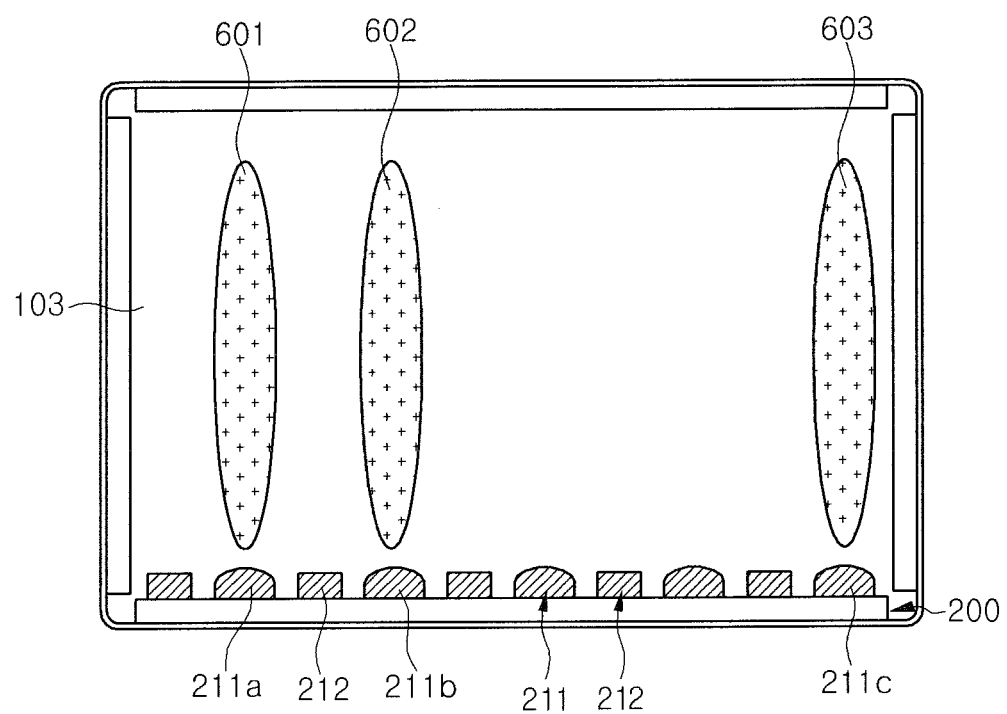
FIGS. 4 to 6 illustrate examples of dimming performed in a display device according to the first embodiment.
Figure 5:
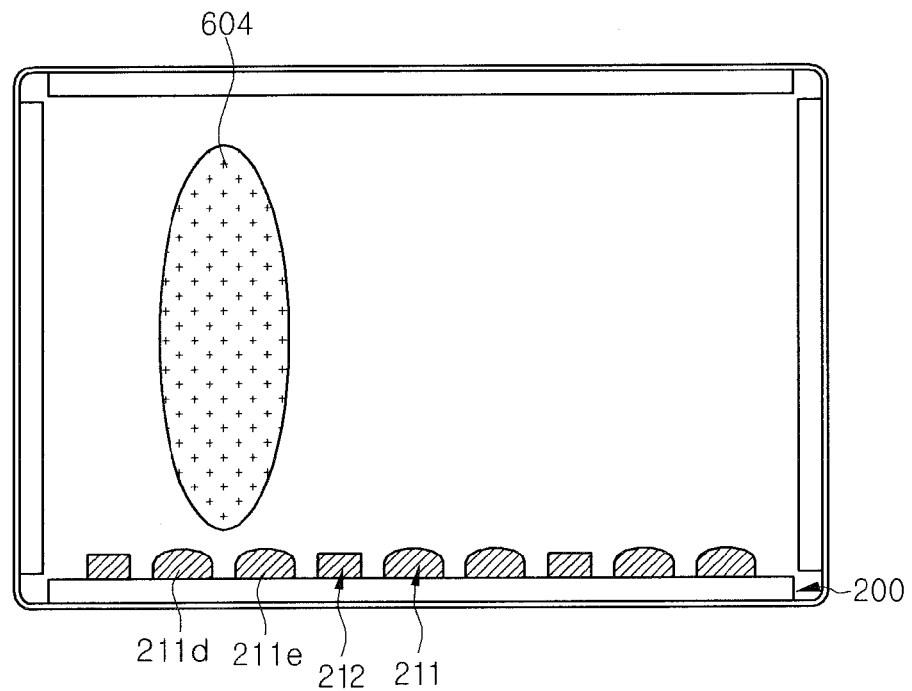
Figure 6:
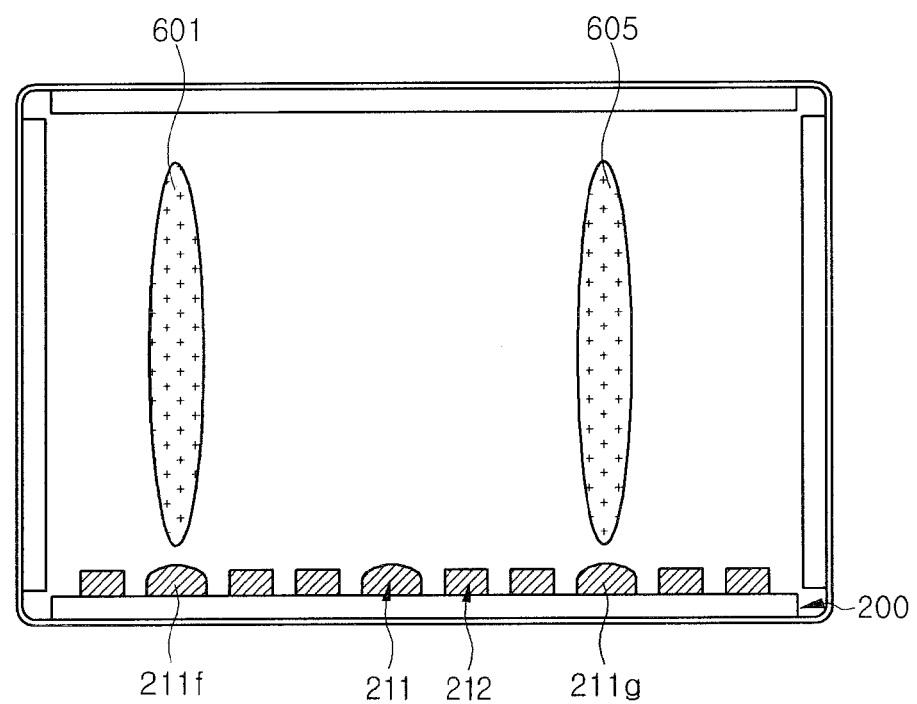

According to the embodiment, the light emitting devices 210 of the light emitting module may have various optical properties as illustrated in FIGS. 4 to 6.

FIGS. 4 to 6 illustrate examples of dimming performed in the display device according to the first embodiment.

Referring to FIGS. 4 to 6, the light emitting module 200 is provided at one side of the light guide plate 103 and includes a plurality of first light emitting devices 211 having superior linearity and a plurality of second light emitting devices 212 having superior orientation angle characteristics.

Referring to FIG. 4, the first and second light emitting devices 211 and 212 are alternately arranged. First light emitting devices 211a, 211b and 211c disposed corresponding to first to third regions 610, 602 and 603 are driven under the control of the controller 110 in order to improve the local brightness of the first to third regions 610, 602 and 603 for the image displayed on the display panel.

That is, if it is necessary to adjust the local brightness of the image, the controller 110 selectively drives the first light emitting devices 211a, 211b, and 211c of the corresponding regions. As shown in the FIG. 4, if it is necessary to adjust the local brightness in the longitudinal direction, the controller 110 selectively drives the first light emitting devices 211a, 211b, and 211c having the superior linearity, which are disposed in line with the corresponding regions.

In order to reduce the hot spot, which may occur as the first light emitting devices 211 having the superior linearity are driven, the controller 110 may drive the second light emitting devices 212 adjacent to the first light emitting devices 211.

That is, the brightness for the local area of the display image can be adjusted according to the position of the first and second light emitting devices 211 and 212 and the controller 110 determines the region of the display image by taking the position of the first and second light emitting devices 211 and 212 into consideration.

Referring to FIG. 5, two first light emitting devices 211 and one second light emitting device 212 are repeatedly arranged. If it is necessary to adjust the local brightness of the fourth region 604 of the display image, the controller 110 drives the first light emitting devices 211d and 211e corresponding to the fourth region 604.

In this case, similarly to the above, the controller 110 may drive the second light emitting devices 212 adjacent to the first light emitting devices 211 in order to reduce the hot spot, which may occur as the first light emitting devices 211 having the superior linearity are driven.

Referring to FIG. 6, one first light emitting device 211 and two second light emitting devices 212 are repeatedly arranged. If it is necessary to adjust the local brightness of the first and fifth regions 601 and 605 of the display image, the controller 110 drives the first light emitting devices 211f and 211g corresponding to the first and fifth regions 601 and 605.

In this case, similarly to the above, the controller 110 may drive the second light emitting devices 212 adjacent to the first light emitting devices 211 in order to reduce the hot spot, which may occur as the first light emitting devices 211 having the superior linearity are driven.

Figure 7:
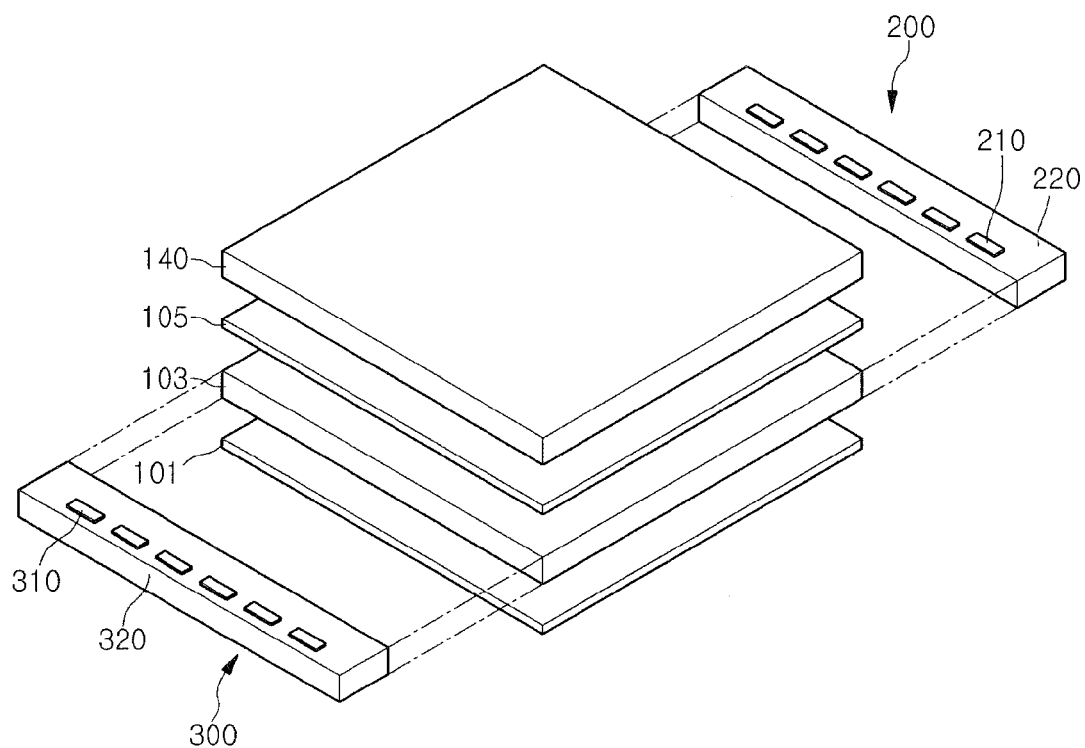
FIG. 7 is an exploded perspective view schematically showing the structure of a display device according to the second embodiment.
Figure 8:
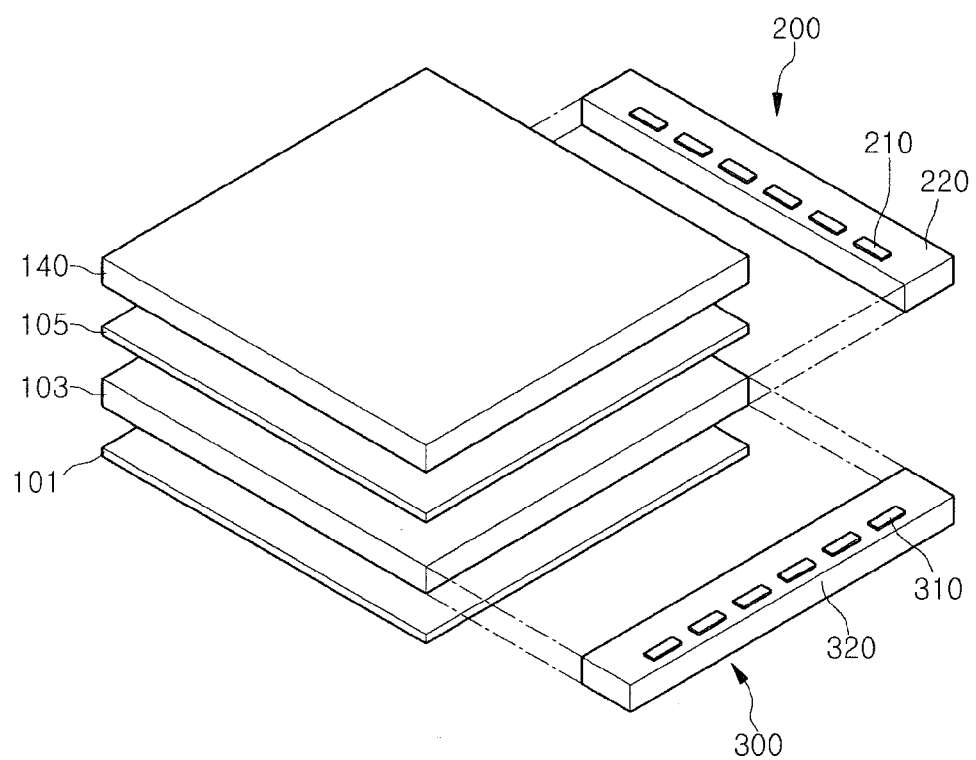
FIG. 8 is an exploded perspective view schematically showing the structure of a display device according to the third embodiment.

FIG. 7 is an exploded perspective view schematically showing the structure of a display device according to the second embodiment, and FIG. 8 is an exploded perspective view schematically showing the structure of a display device according to the third embodiment.

Referring to FIGS. 7 and 8, the display device includes a first light emitting module 200 having light emitting devices 210, a second light emitting module 300, a reflective plate 101, a light guide plate 103, an optical sheet 105 and a display panel 140. The first and second light emitting modules 200 and 300 are provided with a plurality of light emitting devices 210 and 310 mounted on substrates 220 and 320, respectively.

Each of the first and second light emitting modules 200 and 300 is positioned at one lateral side of the light guide plate 103. As shown in FIG. 7, the first and second light emitting modules 200 and 300 may be disposed in opposition to each other. In addition, as shown in FIG. 8, the first and second light emitting modules 200 and 300 may be disposed in perpendicular to each other about the light guide plate 103. The second embodiment is similar to the third embodiment except for the position of the first and second light emitting modules 200 and 300, so the second and third embodiments will be described below together.

The light emitted from the first and second light emitting modules 200 and 300 is incident into the lateral side of the light guide plate 103.

The light guide plate 103 guides the light incident into the light guide plate 103 in such a manner that a surface light can be output through the light guide plate 103. In addition, a reflective pattern can be formed on at least one surface of the light guide plate 103.

The reflective plate 101 is positioned below the light guide plate 103 to reflect the light leaked downward from the light guide plate 103.

The light output from the light guide plate 103 is irradiated onto the display panel 140 through the optical sheet 105. The optical sheet 105 may include at least one of a diffusion sheet and a prism sheet. The diffusion sheet is positioned above the light guide plate 103 to diffuse the incident light. The prism sheet is positioned above the diffusion sheet to focus the diffused light onto the display region.

The display panel 140 is a liquid crystal panel including two transparent substrates and liquid crystal and displays information as the light is transmitted through the liquid crystal. The embodiment does not limit the type of the display panels, so various display panels can be employed in the embodiment. In addition, the display panel can be aligned at both sides of the light guide plate 103.

Such a display device can be used for a portable terminal, such as a cellular phone or a PMP, or a computer.

FIGS. 9 to 12 illustrate examples of dimming performed in the display device according to the second and third embodiments.

Figure 9:
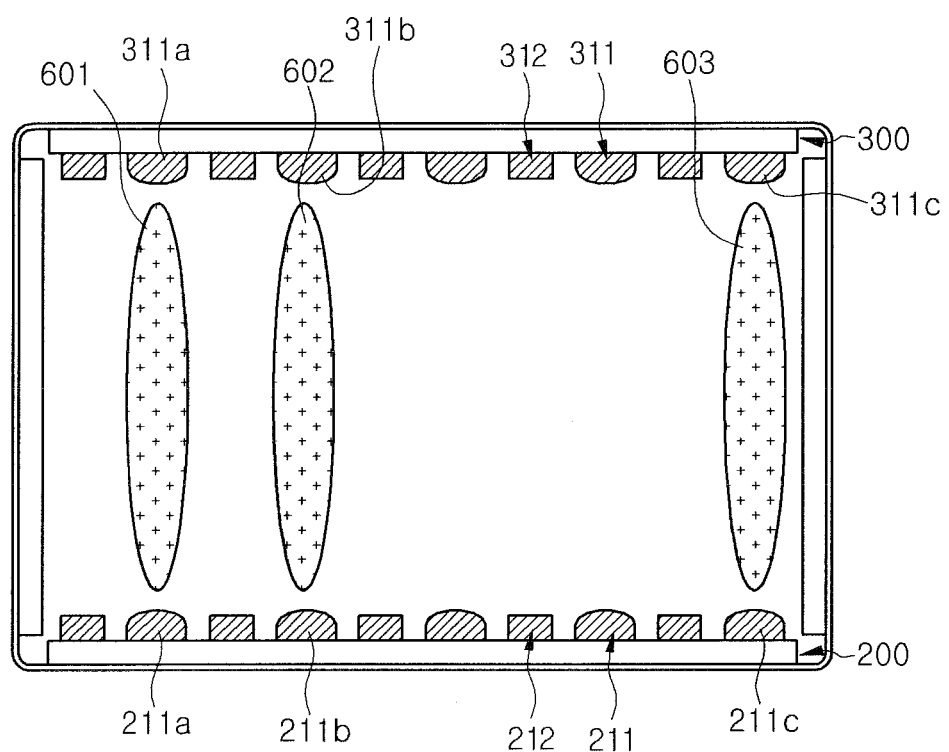
FIGS. 9 to 12 illustrate examples of dimming performed in a display device according to second and third embodiments.
Figure 10:
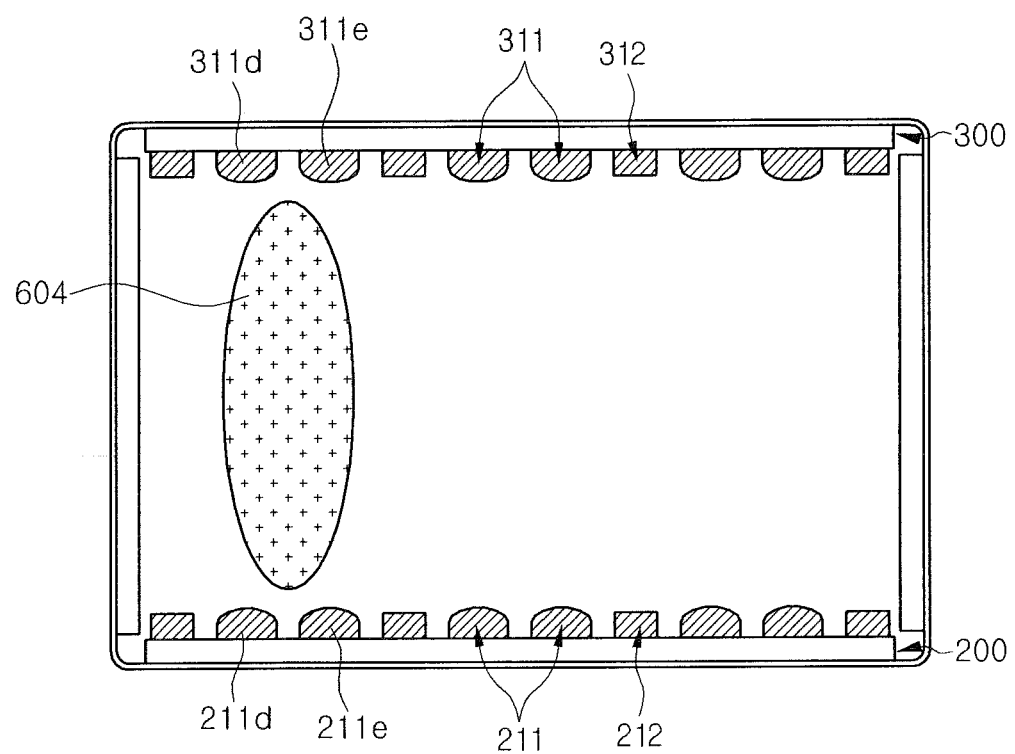
Figure 11:
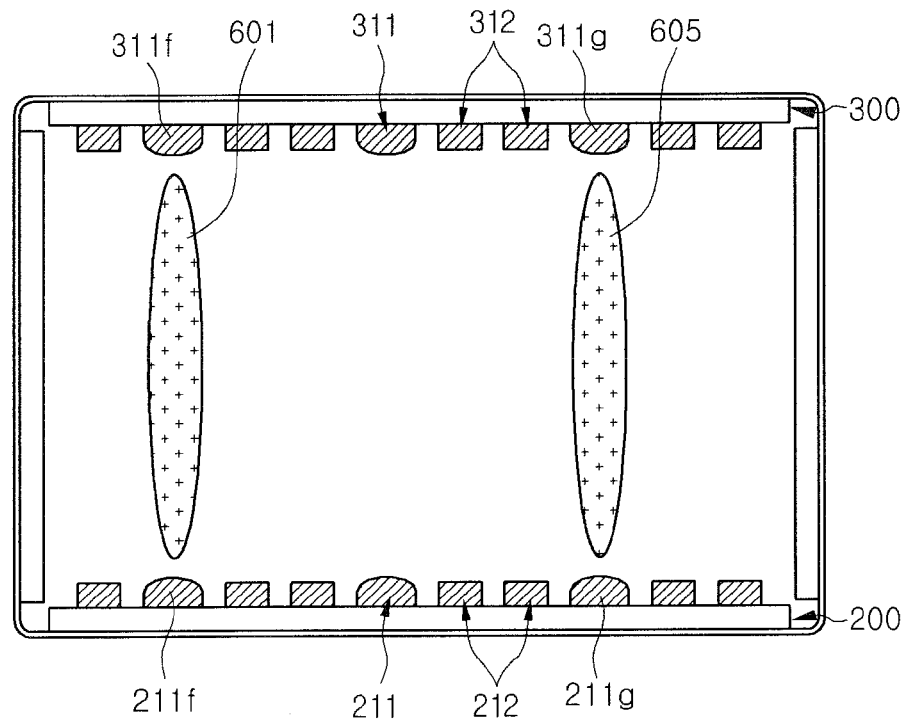
Figure 12:
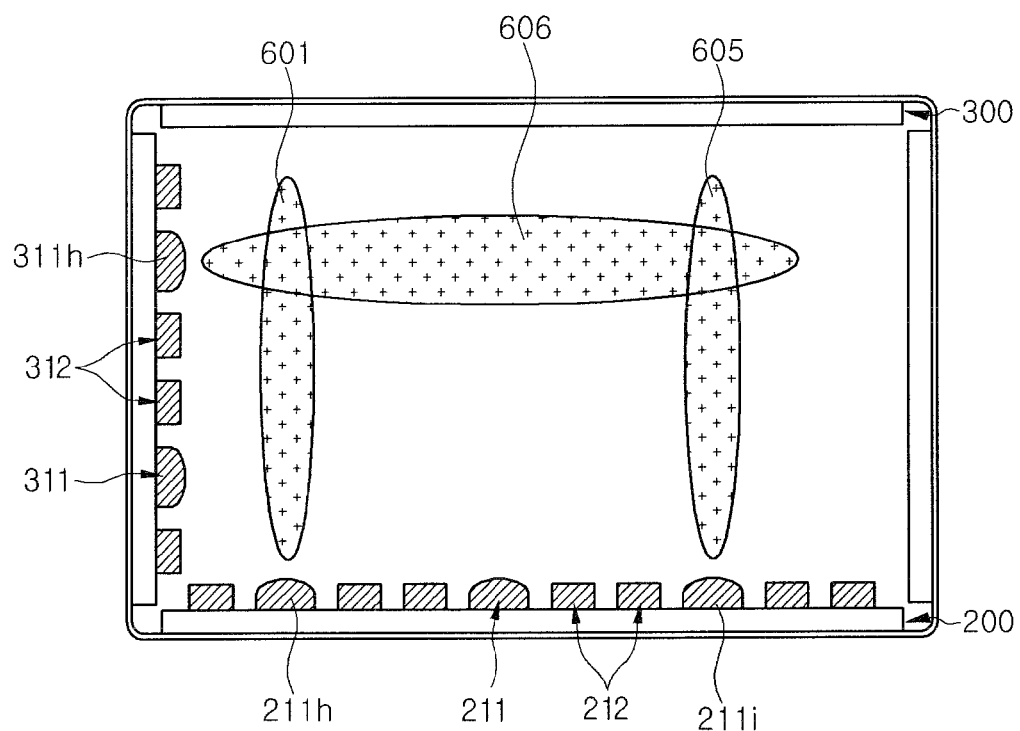

Referring to FIGS. 9 to 11, the first and second light emitting modules 200 and 300 are disposed in opposition to each other about the light guide plate 103. Referring to FIG. 12, the first and second light emitting modules 200 and 300 are disposed in perpendicular to each other about the light guide plate 103 according to the third embodiment.

The light emitting devices shown in FIGS. 9 to 12 may include first light emitting devices 211 having superior linearity and second light emitting devices 212 having superior orientation angle characteristics.

Referring to FIG. 9, the first and second light emitting devices 211 and 212 are alternately arranged in the first light emitting modules 200. The first and second light emitting devices 311 and 312 are alternately arranged in the second light emitting modules 300. The controller 110 drives first light emitting devices 211a, 211b and 211c of the first light emitting module 200 and first light emitting devices 311a, 311b and 311c of the second light emitting module 300 in order to improve the local brightness of the first to third regions 610, 602 and 603 for the image displayed on the display panel.

That is, if it is necessary to adjust the local brightness of the image, the controller 110 selectively drives the light emitting devices 210 and 310 of the corresponding regions. As shown in the drawings, if it is necessary to adjust the local brightness in the longitudinal direction, the controller 110 selectively drives the first light emitting devices 211 and 311 having the superior linearity, which are disposed in line with the corresponding regions.

In order to reduce the hot spot, which may occur as the first light emitting devices 211 having the superior linearity are driven, the controller 110 may drive the second light emitting devices 212 and 312 adjacent to the first light emitting devices 211 and 311.

Referring to FIG. 10, two first light emitting devices 211 and 311 and one second light emitting device 212 and 312 are repeatedly arranged in the first and second light emitting modules 200 and 300. If it is necessary to adjust the local brightness of the fourth region 604 of the display image, the controller 110 selectively drives the first light emitting devices 211d, 211e, 311d, and 311e of the first and second light emitting modules 200 and 300 corresponding to the fourth region 604.

For instance, the controller 110 selectively drives the first light emitting devices 211d and 211e of the first light emitting module 200 and the first light emitting devices 311d and 311e of the second light emitting module 300.

In this case, similarly to the above, the controller 110 may drive the second light emitting devices 212 and 312 adjacent to the first light emitting devices 211 and 311 in order to reduce the hot spot, which may occur as the first light emitting devices 211 and 311 having the superior linearity are driven.

Referring to FIG. 11, one first light emitting device 211 and 311 and two second light emitting devices 212 and 312 are repeatedly arranged in the first and second light emitting modules 200 and 300. If it is necessary to adjust the local brightness of the first and fifth regions 601 and 605 of the display image, the controller 110 selectively drives the first light emitting devices 211 and 311 of the first and second light emitting modules 200 and 300 corresponding to the first and fifth regions 601 and 605.

For instance, the controller 110 selectively drives the first light emitting devices 211f and 211g of the first light emitting module 200 and the first light emitting devices 311f and 311g of the second light emitting module 300.

In this case, similarly to the above, the controller 110 may drive the second light emitting devices 212 and 312 adjacent to the first light emitting devices 211 and 311 in order to reduce the hot spot, which may occur as the first light emitting devices 211 and 311 having the superior linearity are driven.

Referring to FIG. 12, the first and second light emitting modules 200 and 300 are disposed in perpendicular to each other about the light guide plate 103 according to the third embodiment, in which two second light emitting devices 212 and one first light emitting device 212 are repeatedly arranged in the first light emitting module 200, and one second light emitting device 312 and one first light emitting device 311 are repeatedly arranged in the second light emitting module 300.

If it is necessary to adjust the local brightness of the first and fifth regions 601 and 605, which are longitudinally formed, and the sixth region 606, which is transversely formed with a relatively thick thickness, the controller 110 selectively drives the first light emitting devices 211 of the first light emitting module 200 corresponding to the first and fifth regions 601 and 605 and the first light emitting devices 311 of the second light emitting module 300 corresponding to the sixth region 606.

For instance, the controller 110 selectively drives the first light emitting devices 211h and 211i of the first light emitting module 200 and the first light emitting device 311h of the second light emitting module 300.

Thus, the local dimming of the image can be achieved by selectively driving the light emitting devices.

Figure 13:
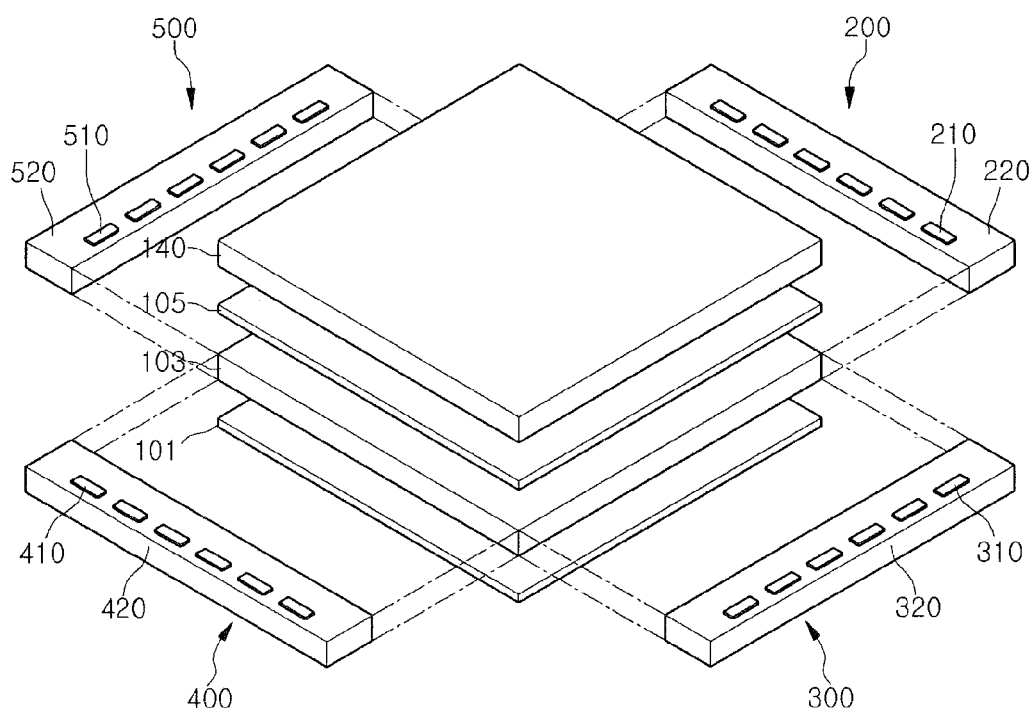
FIG. 13 is an exploded perspective view schematically showing the structure of a display device according to the fourth embodiment.

FIG. 13 is an exploded perspective view schematically showing the structure of a display device according to the fourth embodiment.

Referring to FIG. 13, the display device includes first to fourth light emitting modules 200, 300, 400 and 500 having light emitting devices 210, 310, 410, and 510, a reflective plate 101, a light guide plate 103, an optical sheet 105 and a display panel 140. The first to fourth light emitting modules 200 to 500 are provided with a plurality of light emitting devices 210, 310, 410 and 510 mounted on substrates 220, 320, 420 and 520, respectively.

The first to fourth light emitting modules 200 to 500 are disposed at four lateral sides of the light guide plate 103, respectively. In addition, the first and second light emitting devices 110, 210, 310, and 410 may be arranged in each light emitting module in various configurations.

Hereinafter, the local brightness adjustment for the display image by the first to fourth light emitting modules 200 to 500 will be described.

Figure 14:
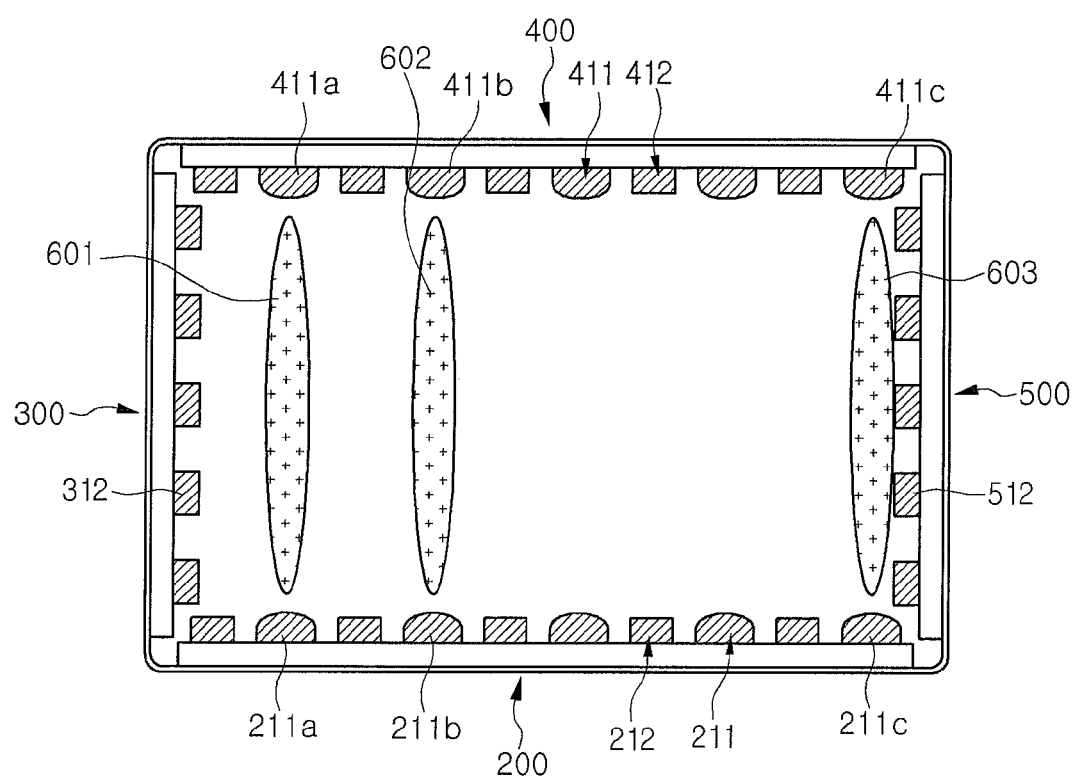
FIGS. 14 to 16 illustrate examples of dimming performed in a display device according to the fourth embodiment.
Figure 15:
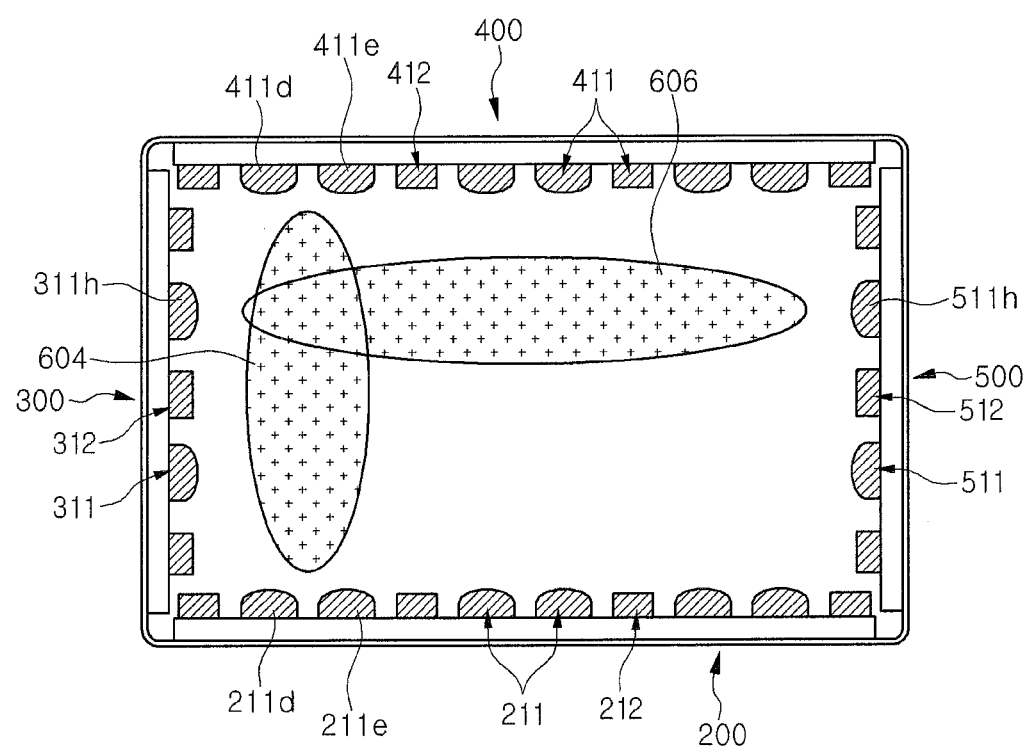
Figure 16:
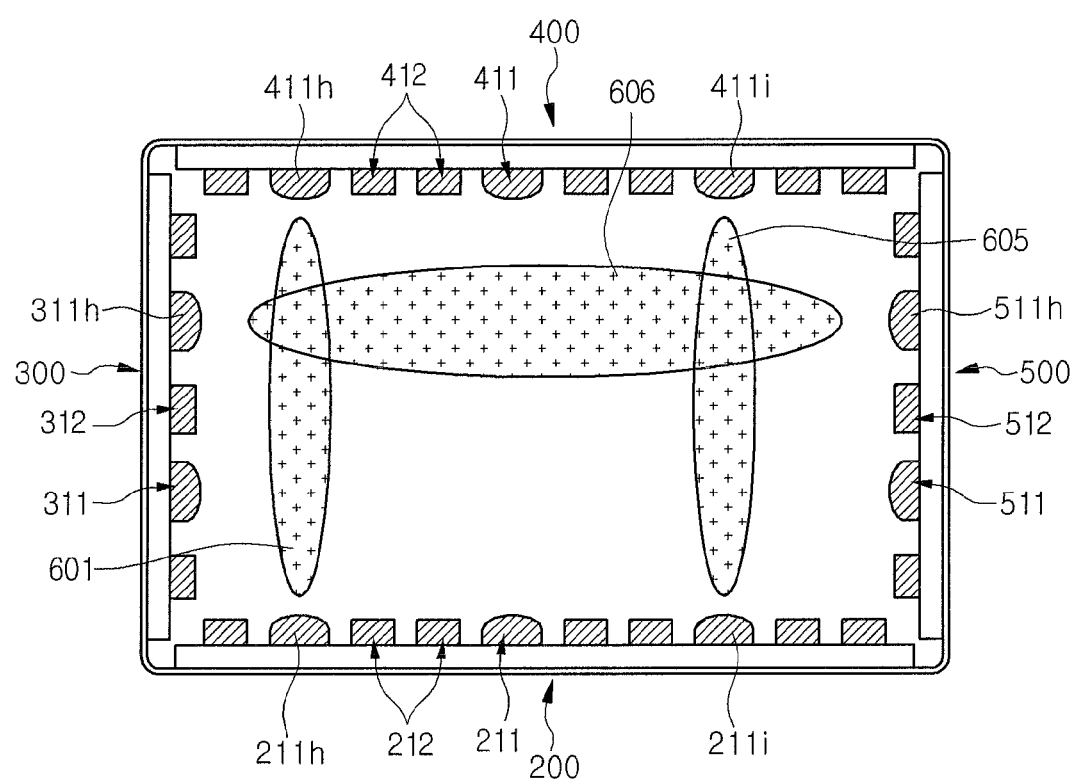

FIGS. 14 to 16 illustrate examples of dimming performed in a display device according to the fourth embodiment.

Referring to FIG. 14, the first and third light emitting modules 200 and 400, which are disposed in opposition to each other in the longitudinal direction, include first and second light emitting devices 211, 212, 411 and 412 repeatedly and alternately arranged one by one. In contrast, the second and fourth light emitting modules 300 and 500 exclusively include the second light emitting devices 312 and 512 having superior orientation angle characteristics.

In this case, the local brightness adjustment for the display image may be performed by the first and third light emitting modules 200 and 400 including the first light emitting devices 211 and 411 having the superior linearity.

In order to adjust the local brightness of the first, second and third regions 601, 602 and 603 of the image displayed on the display panel, the controller 110 selectively drives the first light emitting devices 211a, 211b and 211c of the first light emitting module 200 and the first light emitting devices 411a, 411b and 411c of the third light emitting module 400.

That is, if it is necessary to locally adjust the brightness of the image, the controller 110 selectively drives the light emitting devices of the corresponding regions. As shown in the drawings, if it is necessary to adjust the local brightness in the longitudinal direction, the controller 110 selectively drives the first light emitting devices 211 and 411 having the superior linearity, which are disposed in line with the corresponding regions.

In order to reduce the hot spot, which may occur as the first light emitting devices 211 and 411 having the superior linearity are driven, the controller 110 may drive the second light emitting devices 212 and 412 adjacent to the first light emitting devices 211 and 411.

Referring to FIG. 15, two first light emitting devices 211 and 411 and one second light emitting device 212 and 412 are repeatedly arranged in the first and third light emitting modules 200 and 400. In addition, the first and second light emitting devices 311, 312, 511, and 512 are repeatedly and alternately arranged in the second and fourth light emitting modules 300 and 500 one by one.

If it is necessary to adjust the local brightness of the fourth and sixth region 604 and 606 of the display image, the controller 110 selectively drives the first light emitting devices 211 to 511 of the first to fourth light emitting modules 200 to 500 corresponding to the fourth and sixth regions 604 and 606.

For instance, the controller 110 selectively drives the first light emitting devices 211d and 211e of the first light emitting module 200, the first light emitting device 311h of the second light emitting module 300, the first light emitting devices 411d and 411e of the third light emitting module 400, and the first light emitting device 511h of the fourth light emitting module 500.

In this case, similarly to the above, the controller 110 may drive the second light emitting devices 212 to 512 adjacent to the first light emitting devices 211 to 511 in order to reduce the hot spot, which may occur as the first light emitting devices 211 to 511 having the superior linearity are driven.

Referring to FIG. 16, one first light emitting device 211 and 411 and two second light emitting devices 212 and 412 are repeatedly arranged in the first and third light emitting modules 200 and 400. In addition, the first and second light emitting devices 311, 312, 511, and 512 are repeatedly and alternately arranged in the second and fourth light emitting modules 300 and 500 one by one.

If it is necessary to adjust the local brightness of the first and fifth regions 601 and 605, which are longitudinally formed, and the sixth region 606, which is transversely formed with a relatively thick thickness, the controller 110 selectively drives the first light emitting devices 211 and 411 of the first and third light emitting modules 200 and 400 corresponding to the first and fifth regions 601 and 605 and the first light emitting devices 311 and 511 of the second and fourth light emitting modules 300 and 500 corresponding to the sixth region 606.

For instance, the controller 110 selectively drives the first light emitting devices 211h and 211i of the first light emitting module 200, the first light emitting device 311h of the second light emitting module 300, the first light emitting devices 411h and 411i of the third light emitting module 400, and the first light emitting device 511h of the fourth light emitting module 500.

Thus, the local dimming of the image can be achieved by selectively driving the light emitting devices.

As described above, the embodiment can provide the backlight unit and the display device, which can selectively drive the light emitting devices having superior linearity and the light emitting devices having the wide orientation angle when the dimming is performed to locally increase or decrease the brightness of the display image according to the image data, thereby improving the dimming effect.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A backlight unit comprising:
   a light emitting module including a plurality of light emitting devices;
   a controller for controlling an operation of the light emitting module;
   a light guide plate disposed at one side of the light emitting module; and
   an optical member disposed on or under the light guide plate,
   wherein the light emitting module includes a first light emitting device and a second light emitting device,
   wherein light linearity of the first light emitting device is superior to light linearity of the second light emitting device, and a light orientation angle of the first light emitting device is smaller than a light orientation angle of the second light emitting device, and
   the controller selectively drives the first and second light emitting devices,
   wherein the plurality of light emitting modules comprises:
      a first and a third light emitting modules disposed in opposition to each other in a longitudinal direction, and wherein the first and the third light emitting modules include the first and the second light emitting devices, and
      a second and a fourth light emitting modules disposed perpendicular to the first and the third light emitting modules, wherein the second and the fourth light emitting modules include at least one of the first light emitting device and the second light emitting device,
      wherein an arrangement of the light emitting devices in the first and the third light emitting module is different from an arrangement of the light emitting devices in the second and fourth light emitting modules.

2. The backlight unit of claim 1, wherein the light orientation angle of the first light emitting device is in a range of above 45° to below 100°, and the light orientation angle of the second light emitting device is in a range of 100° to 150°.

3. The backlight unit of claim 2, wherein the light orientation angle of the first light emitting device is in the range of 60° to 90°, and the light orientation angle of the second light emitting device is in the range of 120° to 150°.

4. The backlight unit of claim 1, wherein first and second light emitting devices are repeatedly arranged one by one.

5. The backlight unit of claim 1, wherein a plurality of first light emitting devices and one second light emitting devices are repeatedly arranged.

6. The backlight unit of claim 1, wherein the second and the fourth light emitting module include only the second light emitting device having superior orientation angle characteristics to the first light emitting device.

7. A display device comprising:
   a display panel to display an image;
   a light emitting module to generate light irradiated toward the display panel;
   a light guide plate disposed at one side of the light emitting module to guide the light toward the display panel; and
   a controller for controlling an operation of the light emitting module according to image data by receiving the image data for images to be displayed on the display panel,
   wherein the light emitting module includes a first light emitting device and a second light emitting device,
   wherein light linearity of the first light emitting device is superior to light linearity of the second light emitting device, and a light orientation angle of the first light emitting device is smaller than a light orientation angle of the second light emitting device, and
   the controller selectively drives the first and second light emitting devices according to the image data input thereto,
   wherein the light emitting module comprises:
      a first and a third light emitting modules disposed in opposition to each other in a longitudinal direction, and wherein the first and the third light emitting modules include the first and the second light emitting devices, and
      a second and a fourth light emitting modules disposed perpendicular to the first and the third light emitting modules, wherein the second and the fourth light emitting modules include at least one of the first light emitting device and the second light emitting device,
      wherein an arrangement of the light emitting devices in the first and the third light emitting module is different from an arrangement of the light emitting devices in the second and fourth light emitting modules.

8. The display device of claim 7, wherein the light orientation angle of the first light emitting device is in a range of above 45° to below 100°, and the light orientation angle of the second light emitting device is in a range of 100° to 150°.

9. The display device of claim 7, wherein the light orientation angle of the first light emitting device is in the range of 60° to 90°, and the light orientation angle of the second light emitting device is in the range of 120° to 150°.

10. The display device of claim 7, wherein the controller drives the first light emitting device to locally adjust brightness of the image displayed on the display panel.

11. The display device of claim 7, wherein the controller drives the second light emitting device adjacent to the first light emitting device when driving the first light emitting device.

12. The display device of claim 7, wherein the first and second light emitting devices are alternately arranged one by one in the first light emitting module.

13. The display device of claim 7, wherein a plurality of first light emitting devices and one second light emitting device are repeatedly arranged in the first light emitting module.

14. The display device of claim 7, wherein one first light emitting device and a plurality of second light emitting devices are repeatedly arranged in the first light emitting module.

15. The display device of claim 7, wherein the second and the fourth light emitting module include only the second light emitting device having superior orientation angle characteristics to the first light emitting device.

* * * * *